US012648037B2

(12) United States Patent
Cheng et al.

(10) Patent No.: US 12,648,037 B2
(45) Date of Patent: Jun. 2, 2026

(54) PROTOCOL STACKS AND BEARER MODELING FOR RSU ASSISTED UU CONNECTIVITY

(71) Applicant: QUALCOMM Incorporated, San Diego, CA (US)

(72) Inventors: Peng Cheng, Beijing (CN); Gavin Bernard Horn, La Jolla, CA (US); Karthika Paladugu, San Diego, CA (US); Hong Cheng, Basking Ridge, NJ (US); Qing Li, Princeton Junction, NJ (US); Ozcan Ozturk, San Diego, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 18/023,338

(22) PCT Filed: Oct. 13, 2020

(86) PCT No.: PCT/CN2020/120567
§ 371 (c)(1),
(2) Date: Feb. 24, 2023

(87) PCT Pub. No.: WO2022/077206
PCT Pub. Date: Apr. 21, 2022

(65) Prior Publication Data
US 2023/0319921 A1      Oct. 5, 2023

(51) Int. Cl.
*H04W 76/15* (2018.01)
*H04W 76/20* (2018.01)
*H04W 92/18* (2009.01)

(52) U.S. Cl.
CPC ........... *H04W 76/15* (2018.02); *H04W 76/20* (2018.02); *H04W 92/18* (2013.01)

(58) Field of Classification Search
CPC ...... H04W 76/15; H04W 76/20; H04W 92/18
See application file for complete search history.

(56) References Cited

U.S. PATENT DOCUMENTS 10,206,147 B2    2/2019  Horn et al.
11,134,532 B2 *  9/2021  Futaki ................... H04W 52/36
(Continued)

FOREIGN PATENT DOCUMENTS

CN          109429267 A      3/2019
CN          110536484 A     12/2019
(Continued)

OTHER PUBLICATIONS

International Search Report and Written Opinion—PCT/CN2020/120567—ISA/EPO—Jun. 25, 2021.
(Continued)

*Primary Examiner* — Parth Patel
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for protocol stacks and bearer modeling for assisted Uu connectivity. A UE and a PN may each establish a first connection with an AN and, based on the first connections with the AN, establish a second connection with each other. Based on a bearer configuration, the UE may determine whether to route data to the PN via the first connection with the AN or directly to the PN via the second connection with the PN. Accordingly, the UE may transmit the data to at least one of the AN or the PN based on the determination of whether to route the data to the PN via the first connection with the AN or directly to the PN via the second connection with the PN.

19 Claims, 14 Drawing Sheets

(56) References Cited

U.S. PATENT DOCUMENTS

| | | | | |
|---|---|---|---|---|
| 11,349,557 | B2 * | 5/2022 | Ghosh | H04W 88/18 |
| 11,812,481 | B2 | 11/2023 | Paladugu et al. | |
| 11,910,263 | B2 * | 2/2024 | Xu | H04W 68/005 |
| 2016/0192249 | A1 * | 6/2016 | Wu | H04W 76/19 |
| | | | | 370/331 |
| 2017/0019930 | A1 | 1/2017 | Lee et al. | |
| 2017/0359766 | A1 * | 12/2017 | Agiwal | H04L 5/0048 |
| 2018/0295670 | A1 * | 10/2018 | Decarreau | H04W 76/38 |
| 2019/0110238 | A1 * | 4/2019 | Buckley | H04W 8/06 |
| 2019/0124181 | A1 | 4/2019 | Park et al. | |
| 2019/0223086 | A1 * | 7/2019 | Jung | H04W 76/10 |
| 2019/0373663 | A1 | 12/2019 | Yu et al. | |
| 2020/0169922 | A1 | 5/2020 | Ozturk | |
| 2020/0329513 | A1 * | 10/2020 | Pan | H04W 76/11 |
| 2020/0351699 | A1 * | 11/2020 | Pan | H04W 28/0268 |
| 2020/0351975 | A1 * | 11/2020 | Tseng | H04W 76/19 |
| 2020/0367131 | A1 * | 11/2020 | Tang | H04W 40/22 |
| 2020/0389937 | A1 * | 12/2020 | Liu | H04W 48/18 |
| 2021/0251032 | A1 * | 8/2021 | Wang | H04W 76/15 |
| 2021/0274545 | A1 * | 9/2021 | Adjakple | H04W 72/21 |
| 2021/0368372 | A1 * | 11/2021 | Chen | H04W 76/30 |
| 2022/0095186 | A1 * | 3/2022 | Zhang | H04W 36/14 |
| 2022/0183086 | A1 * | 6/2022 | Müller | H04W 76/10 |
| 2022/0417825 | A1 * | 12/2022 | Youn | H04W 76/22 |
| 2023/0033619 | A1 * | 2/2023 | Lovlekar | H04W 72/541 |
| 2023/0063139 | A1 * | 3/2023 | Du | H04W 28/0268 |
| 2023/0074899 | A1 * | 3/2023 | Wang | H04W 40/12 |
| 2023/0180313 | A1 * | 6/2023 | Freda | H04W 76/14 |
| | | | | 370/310 |
| 2023/0199881 | A1 * | 6/2023 | Freda | H04L 5/0055 |
| | | | | 370/329 |
| 2023/0284106 | A1 * | 9/2023 | Teyeb | H04W 36/0069 |
| | | | | 370/331 |
| 2023/0309179 | A1 * | 9/2023 | Ingale | H04W 36/0069 |
| 2023/0319921 | A1 * | 10/2023 | Cheng | H04W 76/15 |
| | | | | 370/329 |
| 2024/0314634 | A1 * | 9/2024 | Lu | H04W 80/02 |

FOREIGN PATENT DOCUMENTS

| | | | |
|---|---|---|---|
| CN | 111096061 A | | 5/2020 |
| CN | 111316233 A | | 6/2020 |
| CN | 111434183 A | | 7/2020 |
| DE | 102020201827 A1 | | 8/2020 |
| KR | 20200099465 A | * | 8/2020 |
| WO | 2015021370 A1 | | 2/2015 |
| WO | 2015095708 A2 | | 6/2015 |
| WO | 2017071295 A1 | | 5/2017 |
| WO | 2019066628 A1 | | 4/2019 |
| WO | WO-2021034126 A1 | * | 2/2021 |
| WO | 2021178137 A1 | | 9/2021 |

OTHER PUBLICATIONS

Supplementary European Search Report—EP20956988—Search Authority—The Hague—Jun. 12, 2024.

* cited by examiner

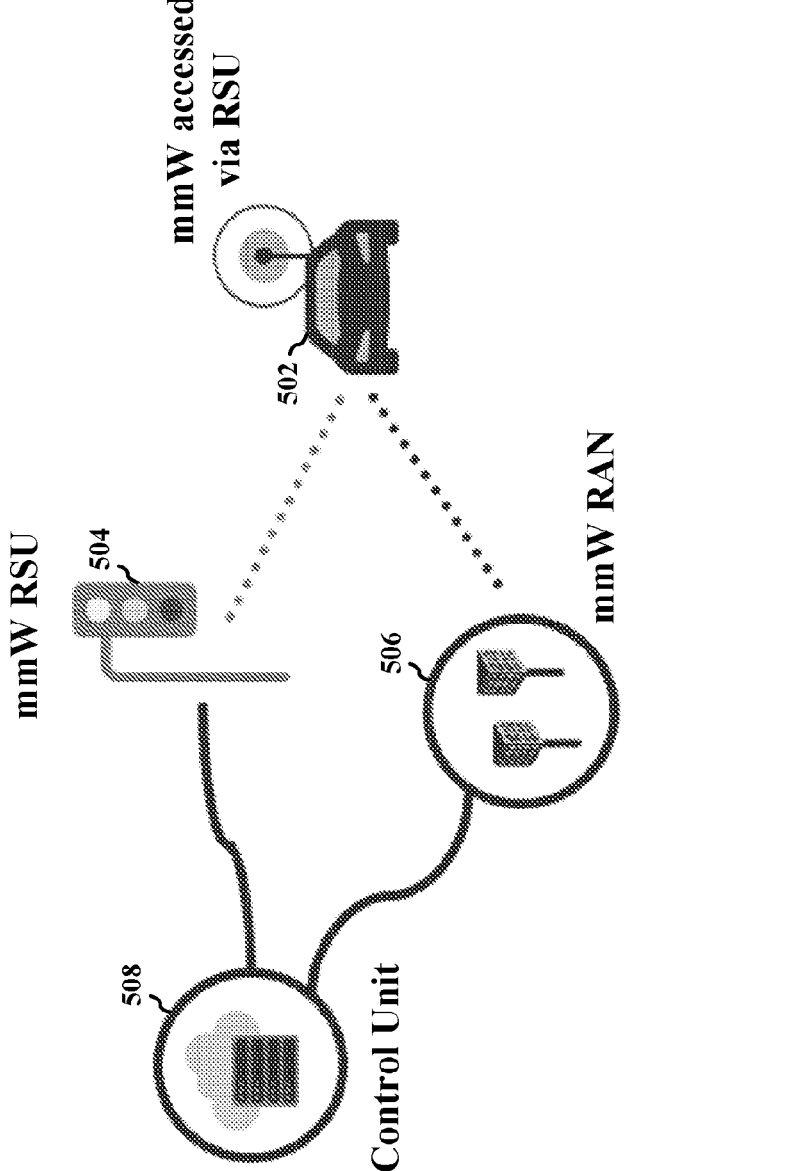
mmW accessed
via RSU
502
mmW RSU
504
mmW RAN
506
508
Control Unit
500
FIG. 5

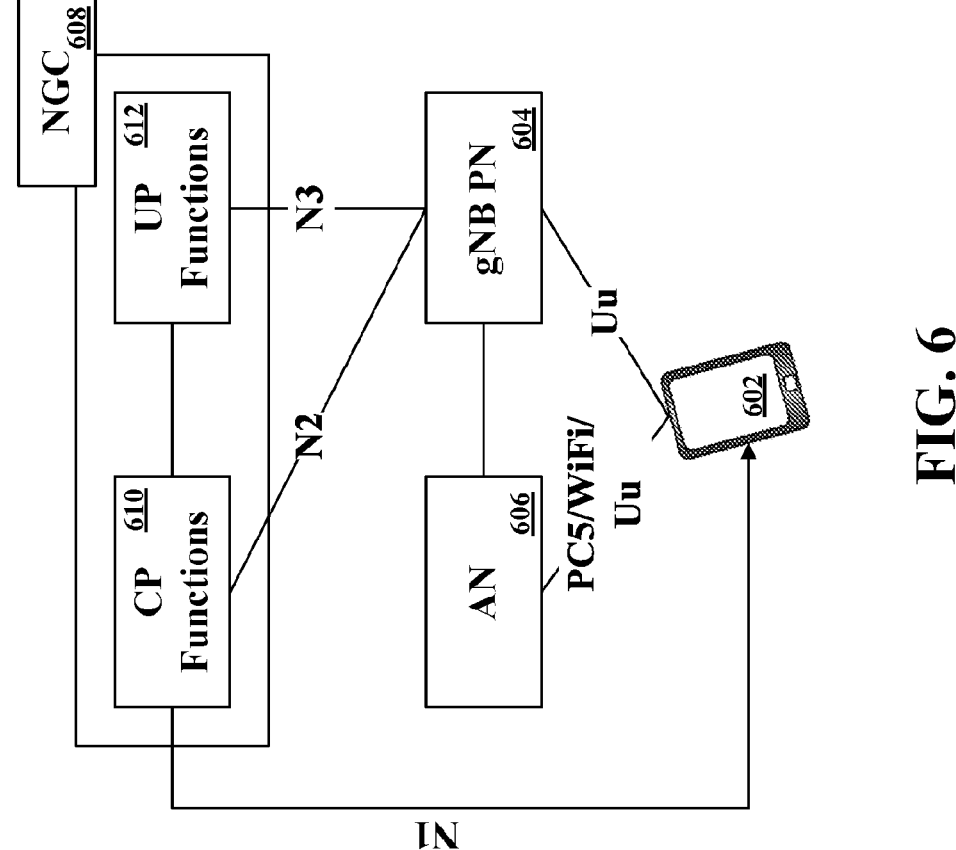
FIG. 6

1000

Secondary RLC

PC5 RLC

PC5 MAC

CC4    CC3

UP anchor

PDCP

Uu RLC

Uu MAC

CC2    CC1

PDCP duplication

1050

| $D_7$ | $D_6$ | $D_5$ | $D_4$ | $D_3$ | $D_2$ | $D_1$ | $D_0$ |
|-------|-------|-------|-------|-------|-------|-------|-------|

Sidelink MAC-CE

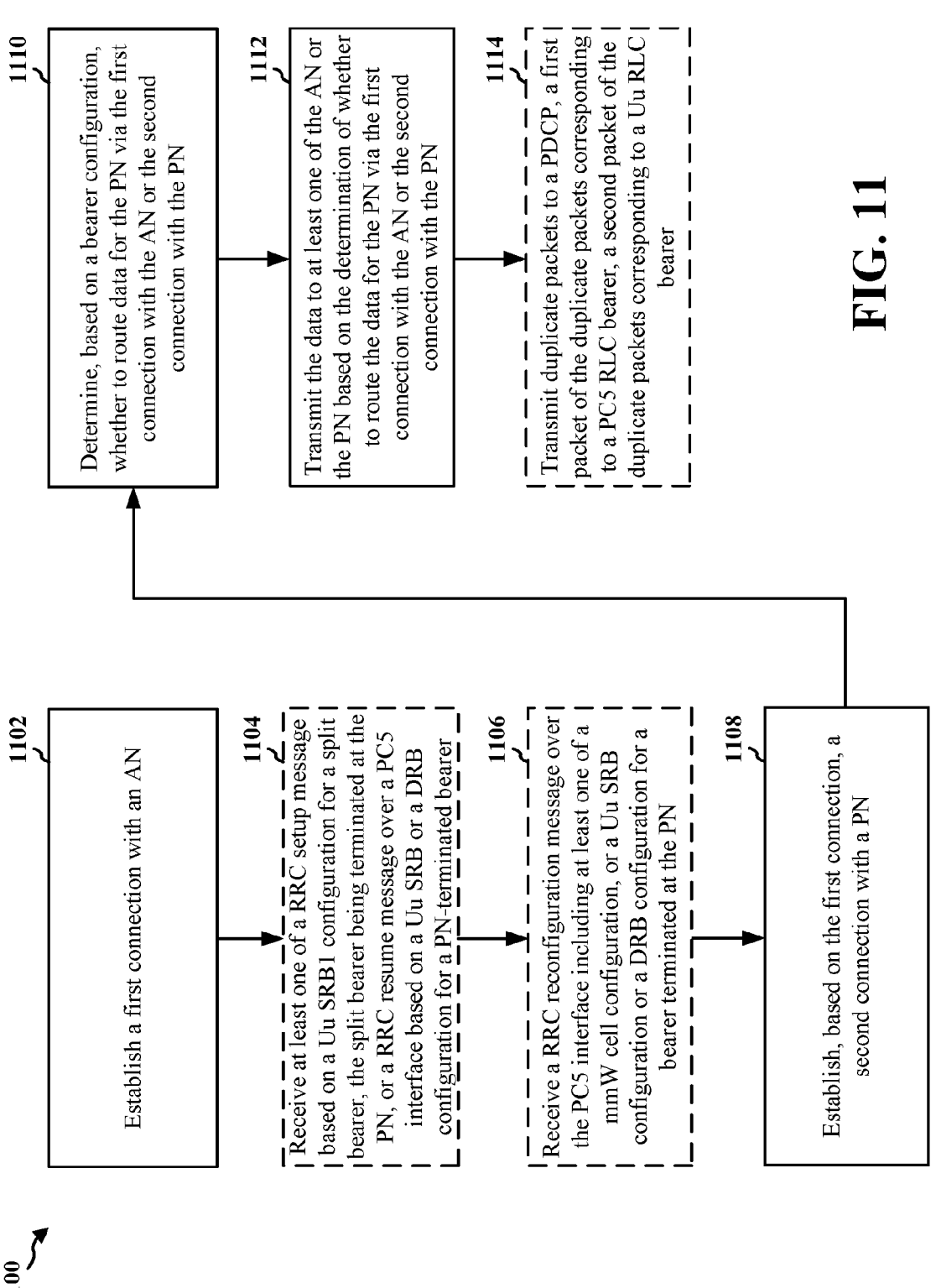

1102
Establish a first connection with an AN

1104
Receive at least one of a RRC setup message based on a Uu SRB1 configuration for a split bearer, the split bearer being terminated at the PN, or a RRC resume message over a PC5 interface based on a Uu SRB or a DRB configuration for a PN-terminated bearer

1106
Receive a RRC reconfiguration message over the PC5 interface including at least one of a mmW cell configuration, or a Uu SRB configuration or a DRB configuration for a bearer terminated at the PN

1108
Establish, based on the first connection, a second connection with a PN

1110
Determine, based on a bearer configuration, whether to route data for the PN via the first connection with the AN or the second connection with the PN

1112
Transmit the data to at least one of the AN or the PN based on the determination of whether to route the data for the PN via the first connection with the AN or the second connection with the PN

1114
Transmit duplicate packets to a PDCP, a first packet of the duplicate packets corresponding to a PC5 RLC bearer, a second packet of the duplicate packets corresponding to a Uu RLC bearer

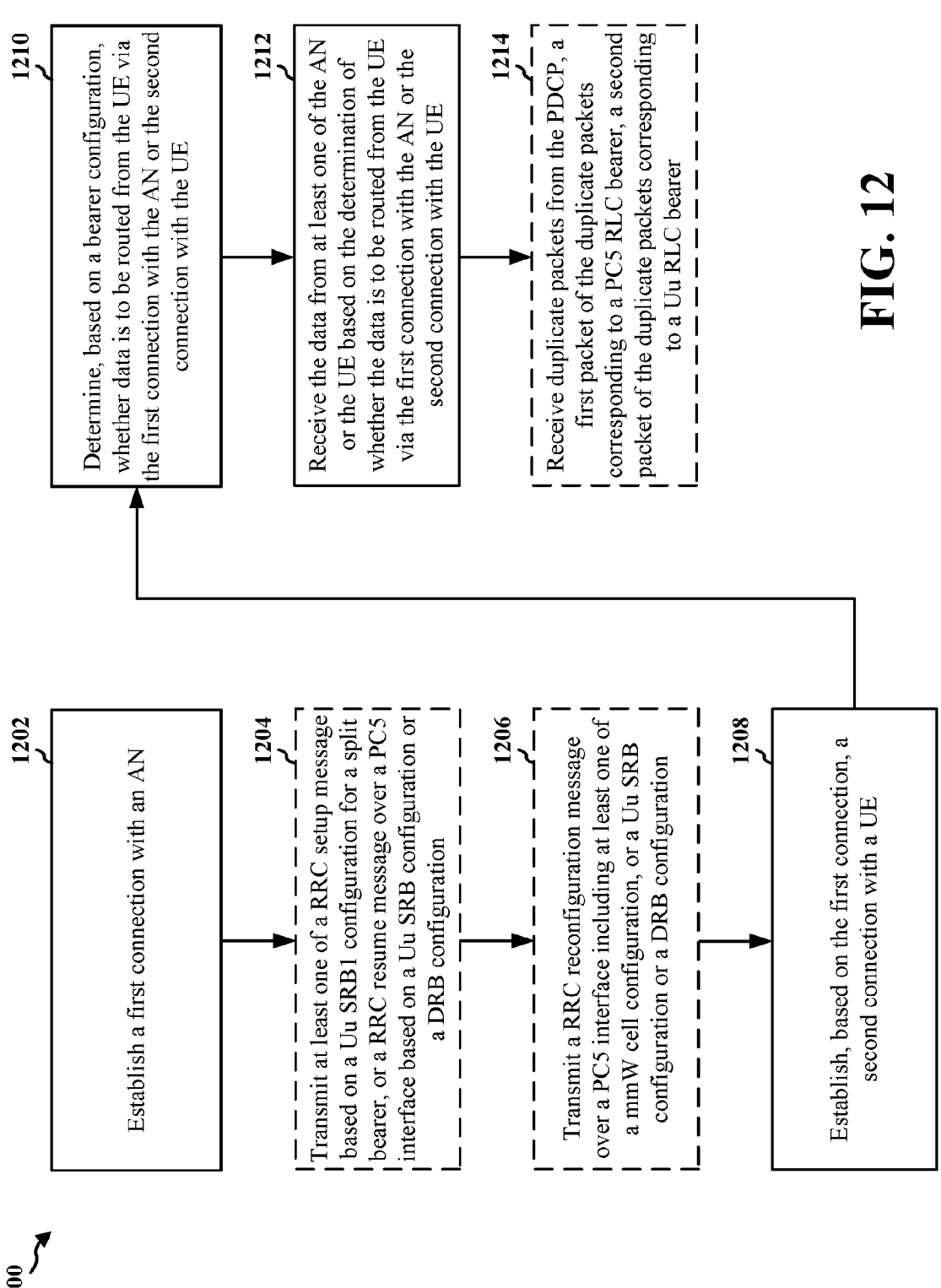

1202
Establish a first connection with an AN

1204
Transmit at least one of a RRC setup message based on a Uu SRB1 configuration for a split bearer, or a RRC resume message over a PC5 interface based on a Uu SRB configuration or a DRB configuration

1206
Transmit a RRC reconfiguration message over a PC5 interface including at least one of a mmW cell configuration, or a Uu SRB configuration or a DRB configuration

1208
Establish, based on the first connection, a second connection with a UE

1210
Determine, based on a bearer configuration, whether data is to be routed from the UE via the first connection with the AN or the second connection with the UE

1212
Receive the data from at least one of the AN or the UE based on the determination of whether the data is to be routed from the UE via the first connection with the AN or the second connection with the UE

1214
Receive duplicate packets from the PDCP, a first packet of the duplicate packets corresponding to a PC5 RLC bearer, a second packet of the duplicate packets corresponding to a Uu RLC bearer

PROTOCOL STACKS AND BEARER MODELING FOR RSU ASSISTED UU CONNECTIVITY

CROSS REFERENCE TO RELATED APPLICATION(S)

This application is a National Stage Application filed under 35 U.S.C. § 371 of PCT International Application No. PCT/CN2020/120567, entitled "PROTOCOL STACKS AND BEARER MODELING FOR RSU ASSISTED UU CONNECTIVITY" and filed Oct. 13, 2020, which is expressly incorporated by reference herein in its entirety.

BACKGROUND

Technical Field

The present disclosure relates generally to communication systems, and more particularly, to protocol stacks and bearer modeling for roadside unit (RSU) assisted Uu connectivity.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE) configured to establish a first connection with an assistant node (AN); establish, based on the first connection, a second connection with a primary node (PN); determine, based on a bearer configuration, whether to route data for the PN via the first connection with the AN or the second connection with the PN; and transmit the data to at least one of the AN or the PN based on the determination of whether to route the data for the PN via the first connection with the AN or the second connection with the PN.

In an aspect of the disclosure, a method, a computer-readable medium, and an apparatus are provided. The apparatus may be a PN configured to establish a first connection with an AN; establish, based on the first connection, a second connection with a UE; determine, based on a bearer configuration, whether data is to be routed from the UE via the first connection with the AN or the second connection with the UE; and receive the data from at least one of the AN or the UE based on the determination of whether the data is to be routed from the UE via the first connection with the AN or the second connection with the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 illustrates a diagram for providing millimeter wave (mmW) communications to a UE/vehicle via a roadside unit (RSU).

FIG. 6 illustrates a diagram of an example network architecture.

FIG. 11 is a flowchart of a method of wireless communication of a UE.

FIG. 12 is a flowchart of a method of wireless communication of a PN.

DETAILED DESCRIPTION

Figure 1:
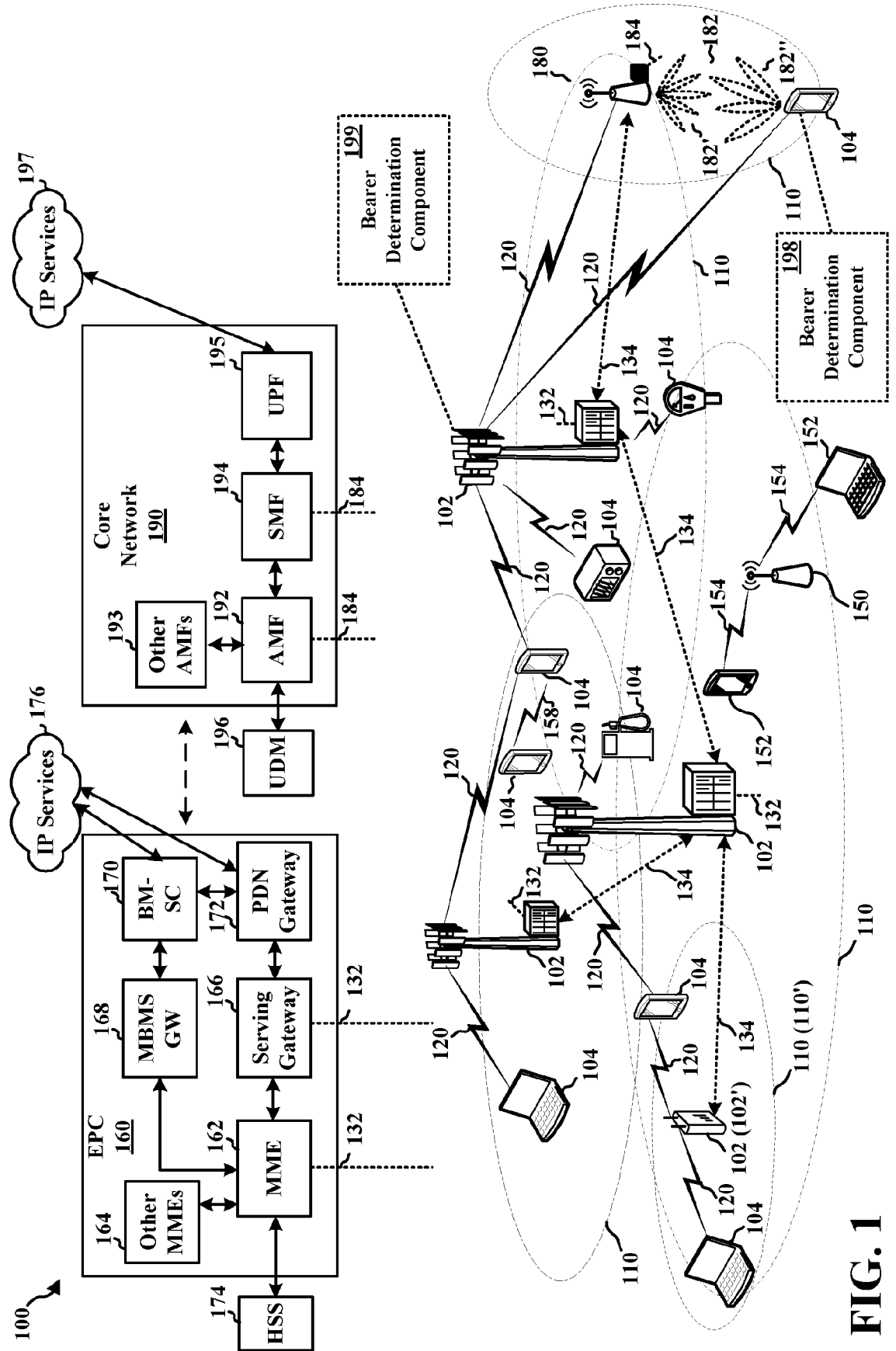
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the user equipment (UE) 104 may include a bearer determination component 198 configured to establish a first connection with an assistant node (AN); establish, based on the first connection, a second connection with a primary node (PN); determine, based on a bearer configuration, whether to route data for the PN via the first connection with the AN or the second connection with the PN; and transmit the data to at least one of the AN or the PN based on the determination of whether to route the data for the PN via the first connection with the AN or the second connection with the PN. In certain aspects a PN/base station 102 may include a bearer determination component 199 configured to establish a first connection with an AN; establish, based on the first connection, a second connection with a UE; determine, based on a bearer configuration, whether data is to be routed from the UE via the first connection with the AN or the second connection with the UE; and receive the data from at least one of the AN or the UE based on the determination of whether the data is to be routed from the UE via the first connection with the AN or the second connection with the UE. Although the following description may be focused on 5G NR, the concepts described herein may be applicable to other similar areas, such as LTE, LTE-A, CDMA, GSM, and other wireless technologies.

Figures 2A, 2B, 2C, 2D:
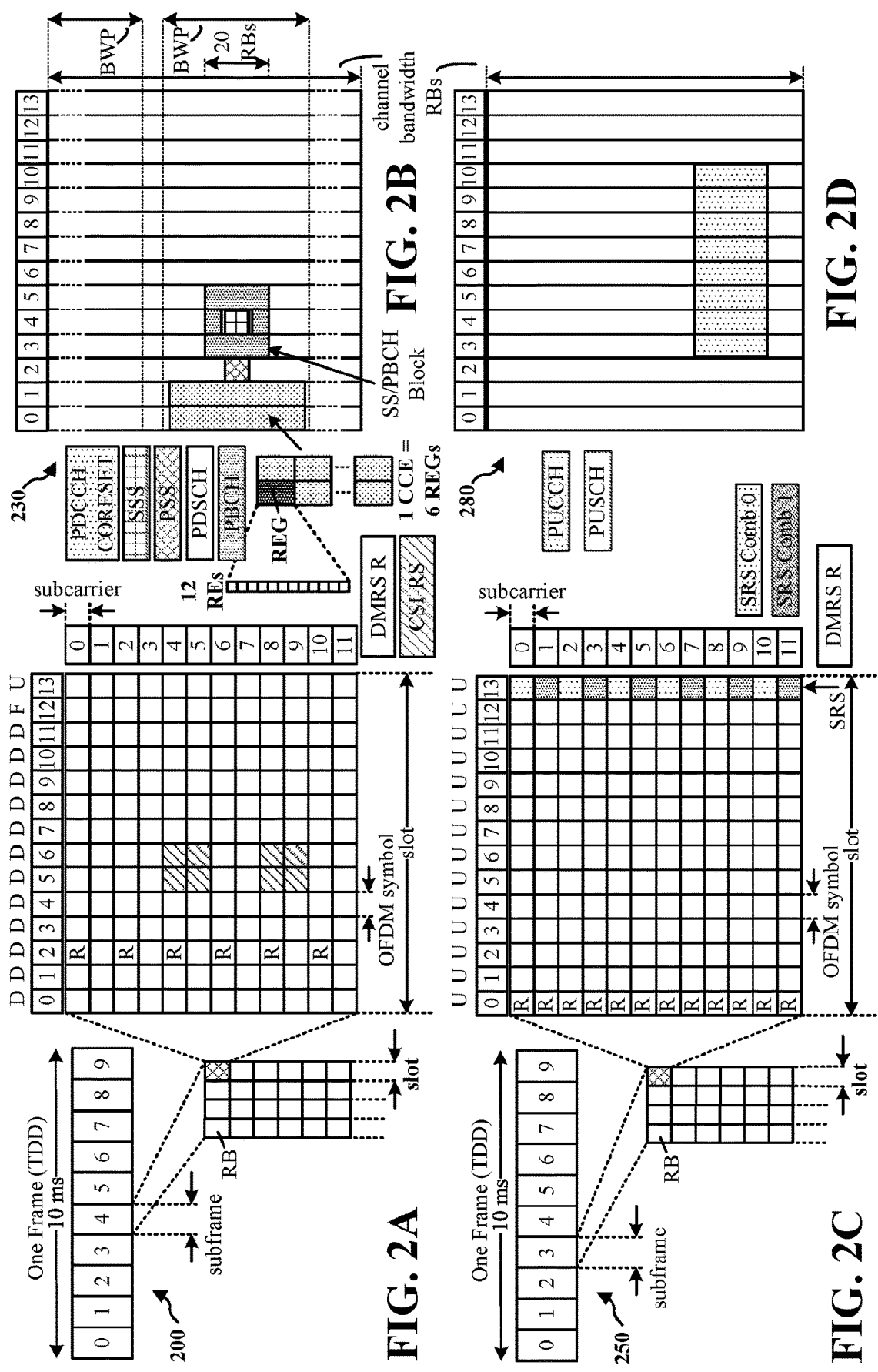
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
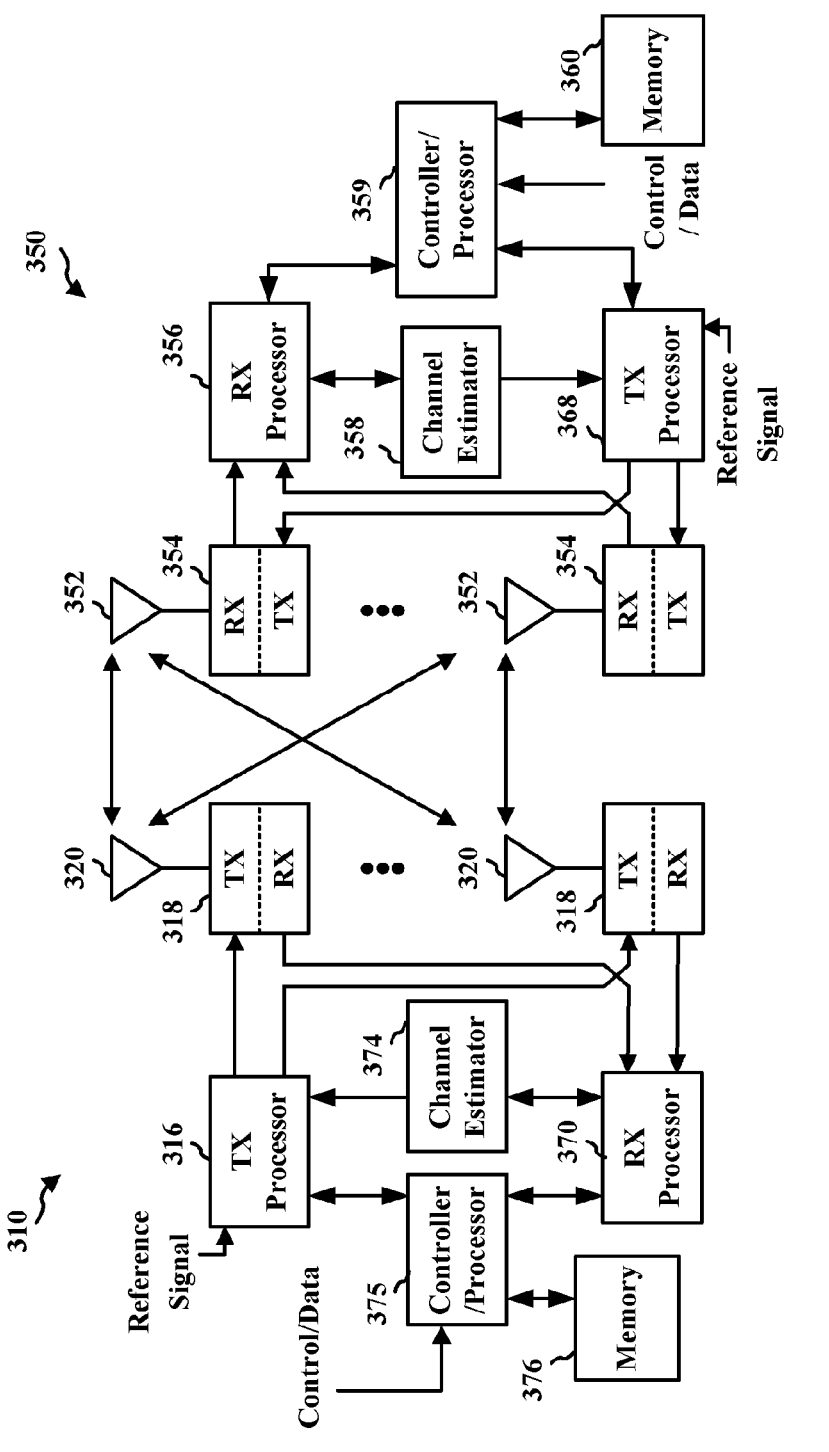
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points trans-mitted by the base station 310. These soft decisions may be based on channel estimates computed by the channel esti-mator 358. The soft decisions are then decoded and deinter-leaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer func-tionality associated with header compression/decompres-sion, and security (ciphering, deciphering, integrity protec-tion, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical chan-nels and transport channels, multiplexing of MAC SDUs onto TBs, demultiplexing of MAC SDUs from TBs, sched-uling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each trans-mitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, con-trol signal processing to recover IP packets from the UE 350. IP packets from the controller/processor 375 may be pro-vided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Wireless communication systems may be configured to share available system resources and provide various tele-communication services (e.g., telephony, video, data, mes-saging, broadcasts, etc.) based on multiple-access technolo-gies such as CDMA systems, TDMA systems, FDMA systems, OFDMA systems, SC-FDMA systems, TD-SCDMA systems, etc. that support communication with multiple users. In many cases, common protocols that facili-tate communications with wireless devices are adopted in various telecommunication standards. For example, com-munication methods associated with eMBB, mMTC, and URLLC may be incorporated in the 5G NR telecommuni-cation standard, while other aspects may be incorporated in the 4G LTE standard. As mobile broadband technologies are part of a continuous evolution, further improvements in mobile broadband remain useful to continue the progression of such technologies.

Figure 4:
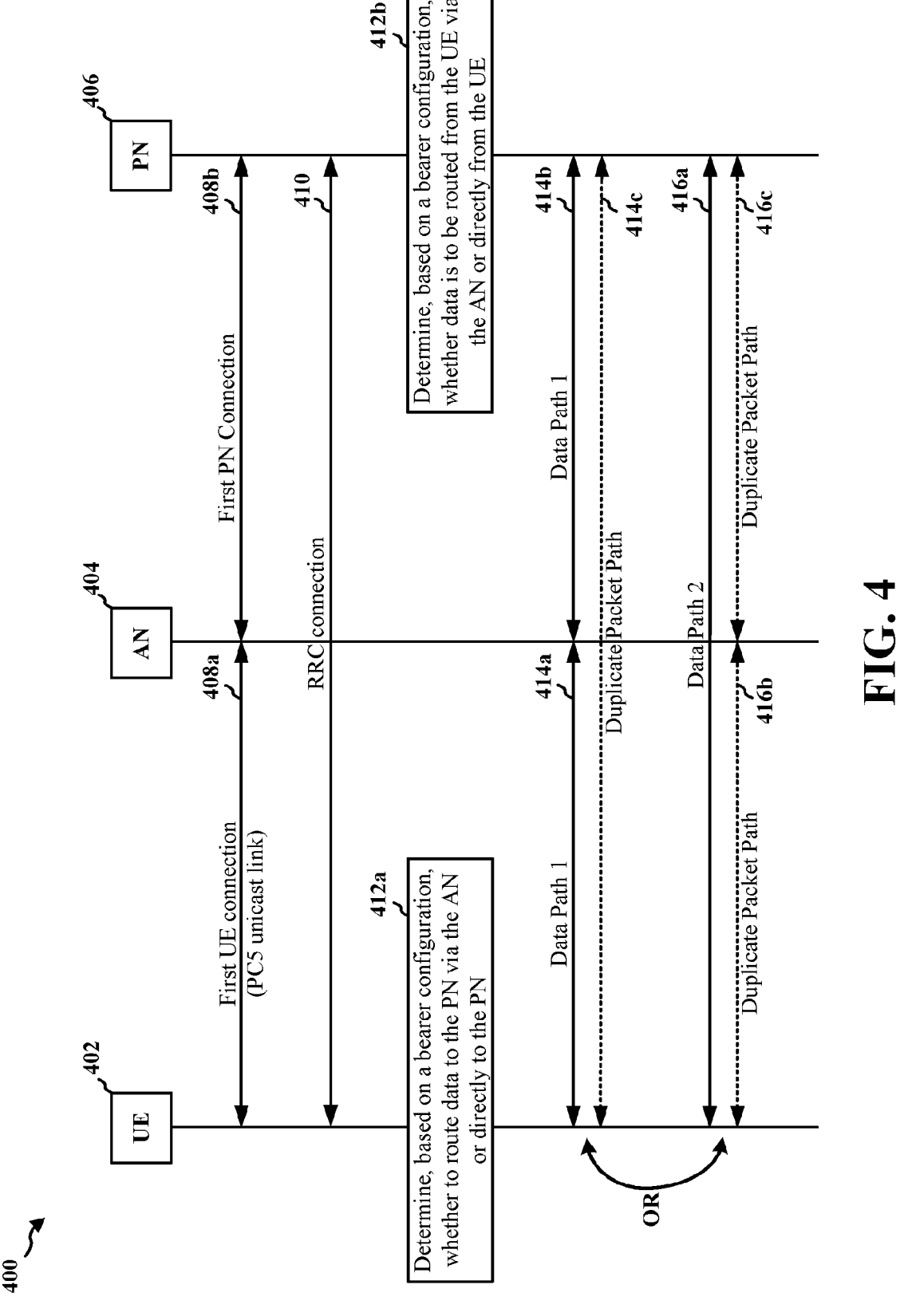
FIG. 4 is a call flow diagram illustrating communications between a UE, an assistant node (AN), and a primary node (PN).

FIG. 4 is a call flow diagram 400 illustrating communi-cations between a UE 402, an AN 404, and a PN 406. At 408*a*, the UE 402 may establish a first UE connection with the AN 404. In examples, the first UE connection may be established, at 408*a*, via a PC5 unicast link. At 408*b*, the PN 406 may likewise establish a first PN connection with the AN 404. Based on the first connections with the AN 404, at 408*a* and 408*b*, the UE 402 and the PN 406 may establish, at 410, a RRC connection with each other. For example, the UE 402 may establish with the PN 406, at 410, a second UE connection, and the PN 406 may establish with the UE 402, at 410, a second PN connection.

At 412*a*, the UE 402 may determine, based on a bearer configuration associated with the first UE connection and the second UE connection, whether to route data from the UE 402 to the PN 406 via the AN 404 or whether to route the data from the UE 402 directly to the PN 406. At 412*b*, the PN 406 may similarly determine, based on a bearer con-figuration associated with the first PN connection and the second PN connection, whether data is to be routed from the UE 402 to the PN 406 via the AN 404 or whether the data is to be routed from the UE 402 directly to the PN 406.

At either 412*a* or 416*a*, the UE 402 may perform a first transmission of the data to the PN 406 based on one of a data path 1, at 414*a* and 414*b*, or a data path 2, at 416*a*. That is, to transmit the data based on the data path 1, the UE 402 may transmit, at 414*a*, the data to the AN 404, which may further transmit/relay, at 414*b*, the data to the PN 406. To transmit the data based on the data path 2, the UE 402 may transmit, at 416*a*, the data directly to the PN 406. In configurations, the UE 402 may perform a second/duplicate transmission of the data to the PN 406 based on a duplicate packet path that is opposite of the data path used to transmit the first transmission of the data/packet. For example, if the UE 402 performs the first transmission of the data based on the data path 1, the UE 402 may perform the second/duplicate transmission of the data via the duplicate packet path, at 416*b* and 416*c*, using the AN 404 to relay the duplicate data packet to the PN 406. If the UE 402 performs the first transmission of the data based on the data path 2, the UE 402 may perform the second/duplicate transmission of the data to the PN 406 via the duplicate packet path, at 414*c*.

FIG. 5 illustrates a diagram 500 for providing millimeter wave (mmW) communications to a UE/vehicle 502 via a roadside unit (RSU) 504. The RSU 504 may utilize a PC5 link to enable non-standalone mmW communications without a network anchor. In examples, a network anchor such as a radio access network (RAN) 506 that operates in the mmW spectrum may be configured to communicate with the UE/vehicle 502. However, the control plane (C-plane) and the user plane (U-plane) may also be provided to the UE/vehicle 502 via the PC5 link. The RSU 504 may relay mmW control signaling from a control unit 508 to the UE/vehicle 502 based on a robustness of the PC5 link. For example, the RSU 504 may additionally be configured to operate in a sub-6 GHz spectrum. Thus, the PC5 link between the UE/vehicle 502 and the RSU 504 may be more robust than a Uu link between the UE/vehicle 502 and the RAN 506. Accordingly, the RSU 504 may serve as an anchor node for the mmW communications over the PC5 link and provide a reliable C-plane to manage the connection as well as a fallback to the U-plane to reduce signal interruptions. After a connection is established, the UE/vehicle 502 may utilize the RAN 506 for a higher data throughput. Such configurations may be enabled transparently to the RSU 504.

FIG. 6 illustrates a diagram 600 of an example network architecture. For RSU assisted connectivity, a UE 602 may establish a Uu RRC connection with a node, such as a gNB PN 604, to increase a reliability associated with a C-plane link connection (e.g., N1). The UE 602 may establish the connection with the PN 604 via an AN 606 using the same or a different RAT. For example, the AN 606 may be a RSU and the Uu RRC connection with the PN 604 may be established in mmW via the RSU. In a second example, the AN 606 may be a WiFi access point (AP) and the Uu RRC connection with the PN 604 may be established in mmW via the WiFi AP. In a third example, the AN 606 may be another base station and the Uu RRC connection with the PN 604 may be established in mmW via the other base station. The other base station may operate in a same or different frequency range from the PN 604.

In configurations, the PN 604 may operate in the sub-6 GHz spectrum, frequency range 2 (FR2) (e.g., mmW spectrum), or a THz frequency spectrum. When the UE 602 fails to establish the RRC connection directly with the PN 604, the UE 602 may transmit a request to establish the RRC connection with the PN 604 (e.g., operating in the mmW spectrum) via the AN 606, which may be connected to the UE 602 through a PC5 link (e.g., if the AN 606 is a RSU). The UE 602 may receive the RRC connection parameters from the PN 604 via the AN 606 and establish the RRC connection with the PN 604. The PN 604 may connect to a core network (e.g., via link N2 for C-plane functions 610 and/or link N3 for U-plane functions 612) to manage the RRC connection of the UE 602 via the core network. In examples, the core network may be a next generation core (NGC) 608.

Control bearers/signaling associated with an RSU may be provided over the PC5 link (e.g., in the sub-6 GHz spectrum) for increased robustness, such that a separate mmW link may be independently managed by the RSU. Data bearers associated with the PN 604 may be provided directly over the Uu link in the mmW spectrum for increased throughput. Communication with a mmW control unit may be transparent to the RSU (e.g., based on an encapsulated message). The network interface between the AN 606 and the PN 604 (e.g., between the RSU and the base station) may be collocated via a standardized interface or a non-standardized interface. For RRC establishment, a difference between the standardized interface and the non-standardized interface may be whether standardized/internal signaling is performed between the AN 606 and the PN 604 or whether the signaling is skipped for determining information to be shared between the AN 606 and the PN 604 (e.g., the RSU and the base station). In examples, the standardized interface may correspond to an IP tunnel (e.g., X2/Xn) or any other network interface associated with an IP.

In examples, the UE 602 may establish a first connection with the AN 606 via the PC5 interface and establish a second connection with the PN 604 via the first connection with the AN 606. Based on the connections from the UE 602 to the AN 606 and the AN 606 to the PN 604, the UE 602 may determine whether data may be transmitted/routed to the PN 604 via the AN 606 based on signaling radio bearer (SRB) or dedicated radio bearer (DRB) configurations (e.g., split bearer, primary cell group (PCG) bearer, assistant cell group (ACG) bearer, etc.). If the bearers may be routed to the PN 604 via the AN 606, the data may be provided to the PN 604 based on the second connection.

Figures 7A, 7B:
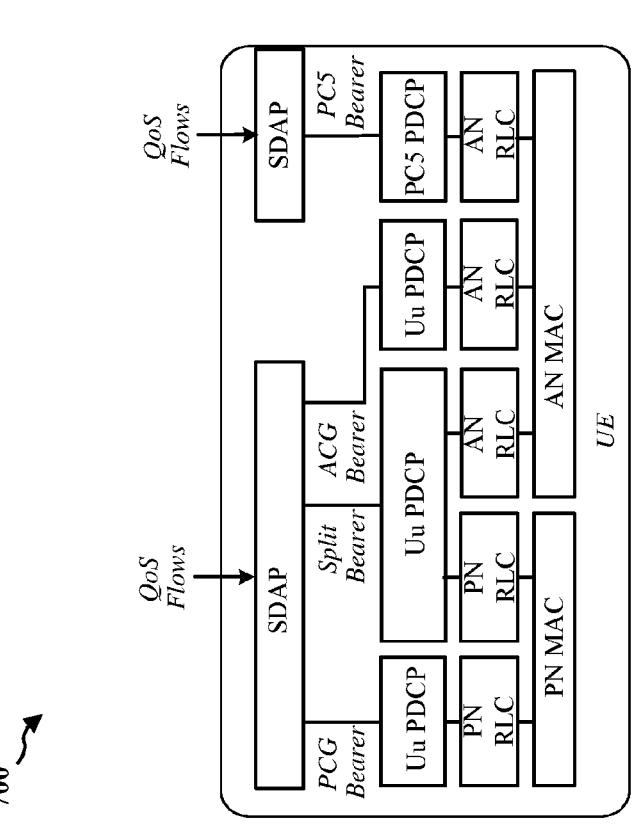
FIGS. 7A-7B illustrate a user-plane (U-plane) protocol stack and a control-plane (C-plane) protocol stack for a UE.

FIGS. 7A-7B illustrate a U-plane protocol stack 700 and a C-plane protocol stack 750 for a UE. The U-plane protocol stack 700 may be associated with a plurality of bearers. For example, a first bearer may be a PCG bearer, where data may be sent from a SDAP through a Uu PDCP and a PN RLC to a PN MAC. A second bearer may be an ACG bearer where data may be sent from the SDAP through the Uu PDCP and an AN RLC to an AN MAC. A third bearer may be a split bearer where data may be sent from the SDAP through the Uu PDCP and both of the PN RLC and the AN RLC to both of the PN MAC and the AN MAC. In aspects, the ACG bearer and the split bearer may be terminated in the PN. A PC5 bearer (e.g., terminated in a RSU/AN) may provide data from the SDAP through a PC5 PDCP and the AN RLC to the AN MAC. In examples, the UE may execute an independent vehicle-to-everything (V2X) application for the RSU/AN through a separate SDAP. Accordingly, for the U-plane protocol stack 700, a Uu PDCP may be used for the PCG bearer, the ACG bearer, and the split bearer, and the PC5 PDCP may be used for the PC5 bearer.

The C-plane protocol stack 750 may be associated with a plurality of SRB bearers. In examples, SRB1 and SRB2 may be provided via the PCG bearer. In further examples, SRB1 and SRB2 may be split via the split bearer (e.g., terminated in the PN). The PC5 SRB may be terminated in the RSU/AN. In aspects, the UE may execute an independent V2X application for the RSU/AN. Similar to the U-plane protocol stack 700, the C-plane protocol stack 750 may include a Uu PDCP for the PCG bearer and the split bearer, and a PC5 PDCP for the PC5 bearer. A difference between the C-plane protocol stack 750 and the U-plane protocol stack 700 is that the C-plane protocol stack 750 may not include the ACG bearer terminated in the PN. For SRBs, a direct path or a split path may be utilized for the bearers.

Figures 8A, 8B:
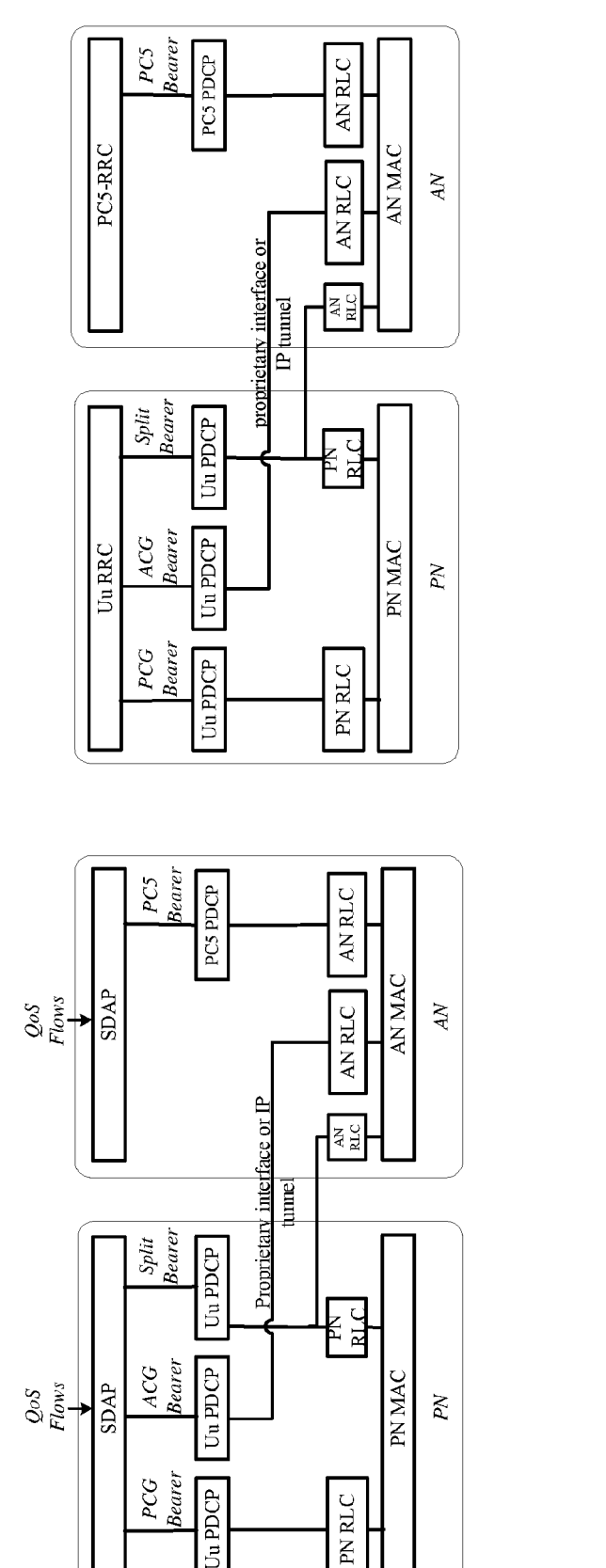
FIGS. 8A-8B illustrate a U-plane protocol stack and a C-plane protocol stack for a network.

FIGS. 8A-8B illustrate a U-plane protocol stack 800 and a C-plane protocol stack 850 for a network. The U-plane protocol stack 800 may be associated with a plurality of bearers. For example, a first bearer may be a PN terminated PCG bearer and a second bearer may be a PN terminated ACG bearer, where packets for the second bearer may be transmitted in a RLC to the AN based on a proprietary interface or an IP tunnel. Further, a third bearer may be a PN terminated split bearer and a fourth bearer may be a RSU terminated PC5 bearer. A Uu PDCP may be used for each of the PN terminated bearers, and the PC5 PDCP may be used for the RSU/AN terminated bearer. The interface/IP tunnel between the AN (e.g., RSU) and the PN (e.g., gNB/base station) may be an Xn interface.

The C-plane protocol stack 850 may be associated with a plurality of SRB bearers. In examples, SRB1 and SRB2 may be provided via the PN terminated PCG bearer. In further examples, SRB1 and SRB2 may be provided via the PN terminated ACG bearer. In still further examples, SRB1 and SRB2 may be split via the PN terminated split bearer. The PC5 SRB may be provided via the RSU/AN terminated PC5 bearer. Similar to the U-plane protocol stack 800, the C-plane protocol stack 850 may include a Uu PDCP for each of the PN terminated bearers, and a PC5 PDCP for the RSU/AN terminated bearer. The interface/IP tunnel between the AN (e.g., RSU) and the PN (e.g., gNB/base station) may be similar to an Xn interface.

Figure 9:
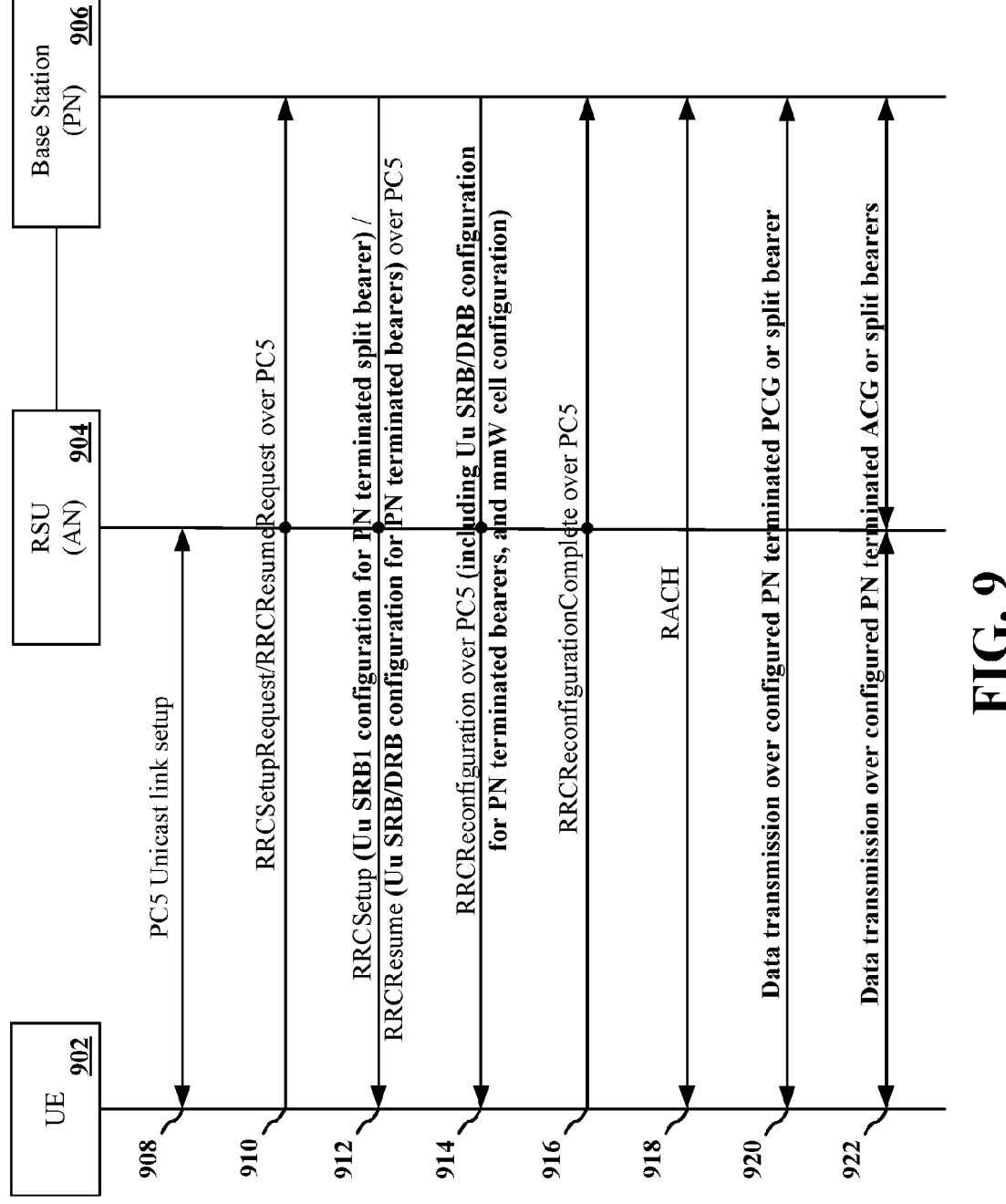
FIG. 9 is a call flow diagram illustrating communications between a UE, an AN, and a PN.

FIG. 9 includes a call flow diagram 900 illustrating communications between a UE 902, a RSU/AN 904, and a base station/PN 906. The call flow diagram 900 may correspond to a connection management technique associated with a bearer configuration (e.g., for a protocol stack). In examples, bearer configurations for protocol stacks may be configured by the network.

At 908, the UE 902 and the RSU/AN 904 may perform a PC5 unicast link setup procedure. Based on a channel in the PC5 link for transmitting a Uu RRC connection message, the UE 902 may request to establish a RRC connection with the base station/PN 906 via the RSU/AN 904. At 910, the UE 902 may transmit a RRCSetupRequest message from an idle state or a RRCResumeRequest message from inactive state to the RSU/AN 904 through dedicated signaling over the PC5 link, which may be further transmitted to the base station/PN 906. The Uu RRC connection message/signaling may be encapsulated in a corresponding PC5-S or PC5-RRC message to provide a transparent exchange from the UE 902 to the base station/PN 906 via the RSU/AN 904. In examples, the UE 902 may select the RSU/AN 904. For instance, the RSU may broadcast a discovery message that is received by the UE 902 to select the RSU based on higher layer criteria (e.g., a PC5 reference signal receive power (RSRP) measurement). After selecting the RSU/AN 904, the UE 902 may establish a PC5-RRC connection with the RSU/AN 904.

At 912, the base station/PN 906 may transmit a RRCSetup message or a RRCResume message to the RSU/AN 904 over the PC5 link, which may be further transmitted to the UE 904, in response to the RRCSetupRequest message or the RRCResumeRequest message received, at 910. The PC5 RRCSetup message may be associated with a Uu SRB1 configuration for PN terminated split bearers and the PC5 RRCResume message may be associated with a Uu SRB/DRB configuration for PN terminated bearers. At 914, the base station/PN 906 may transmit a RRCReconfiguration message over the PC5 link to the UE 902 (e.g., via the RSU/AN 904) to reconfigure one or more parameters of the UE 902. The RRCReconfiguration message over the PC5 link may include a Uu SRB/DRB configuration for PN terminated bearers and a mmW cell configuration.

At 916, the UE 902 may indicate a completion of the RRC reconfiguration based on an RRCReconfigurationComplete message transmitted to the base station/PN 906 over the PC5 via the RSU/AN 904. At 918, the UE 902 and the base station/PN 906 may perform a RACH procedure for data transmissions between the UE 902 and the base station/PN 906. An increased throughput for the data may be provided after the UE 902 establishes the RRC connection with the base station/PN 906.

After the RACH procedure occurs, the UE 902 may have an established connection between both the RSU/AN 904 and the base station/PN 906 for performing data transmissions over at least two different links. First, at 920, a data transmission may be performed over a configured PN terminated PCG bearer or split bearer. That is, the UE 902 may transmit data based on a direct mmW link to the base station/PN 906 for increased throughput. Second, at 922, a data transmission may be performed over a configured PN terminated ACG or split bearer. However, using the PC5 link for an intermediate hop to the RSU/AN 904 may be more suitable for control signals, as data transmissions may be configured to target increased throughput. Thus, after the RACH procedure occurs, at 918, data may be primarily transmitted over the direct mmW link to the base station/PN 906, rather than the PC5 link.

SRB modeling and DRB modeling may be performed for connection management techniques. In examples, SRB1 and SBR2 modeling may be based on a Uu PDCP and a Uu RLC/MAC/PHY via a PN terminated PCG bearer or a PN terminated ACG bearer. Split SRB1 and SBR2 modeling may be based on the Uu PDCP and a PC5 RLC/MAC/PHY via a PN terminated split bearer. PC5 SRB modeling may be based on a PC5 PDCP/RLC/MAC/PHY via a RSU terminated PC5 bearer. In some configurations, there may be no bearer type change and/or bearer termination point change for a SRB.

DRB modeling may be associated with a bearing type selection. For example, the base station/PN 906 may a manage Uu QoS flows with PCG bearers, ACG bearers, or split bearers (e.g., first QoS Flows of the U-plane protocol stacks 700 and 800). The RSU/AN 904 may manage PC5 QoS flows with PC5 bearers (e.g., second QoS Flows of the U-plane protocol stacks 700 and 800). A plurality of bearer type change options may be supported in association with DRB modeling, such as changes between the PCG bearer to/from the split bearer, the PCG bearer to/from the (PN terminated) ACG bearer, and/or the (PN terminated) ACG bearer to/from the split bearer. The bearer type changes may indicate the network may reconfigure the path/type of the bearers and the UE 902 may change a path of the data flow based on the reconfigured bearer configuration. Since the PC5 bearer may be independently managed by the RSU/AN 904, bearer termination point changes may not be supported (e.g., PN terminated bearer to/from AN terminated bearer).

Figure 10:
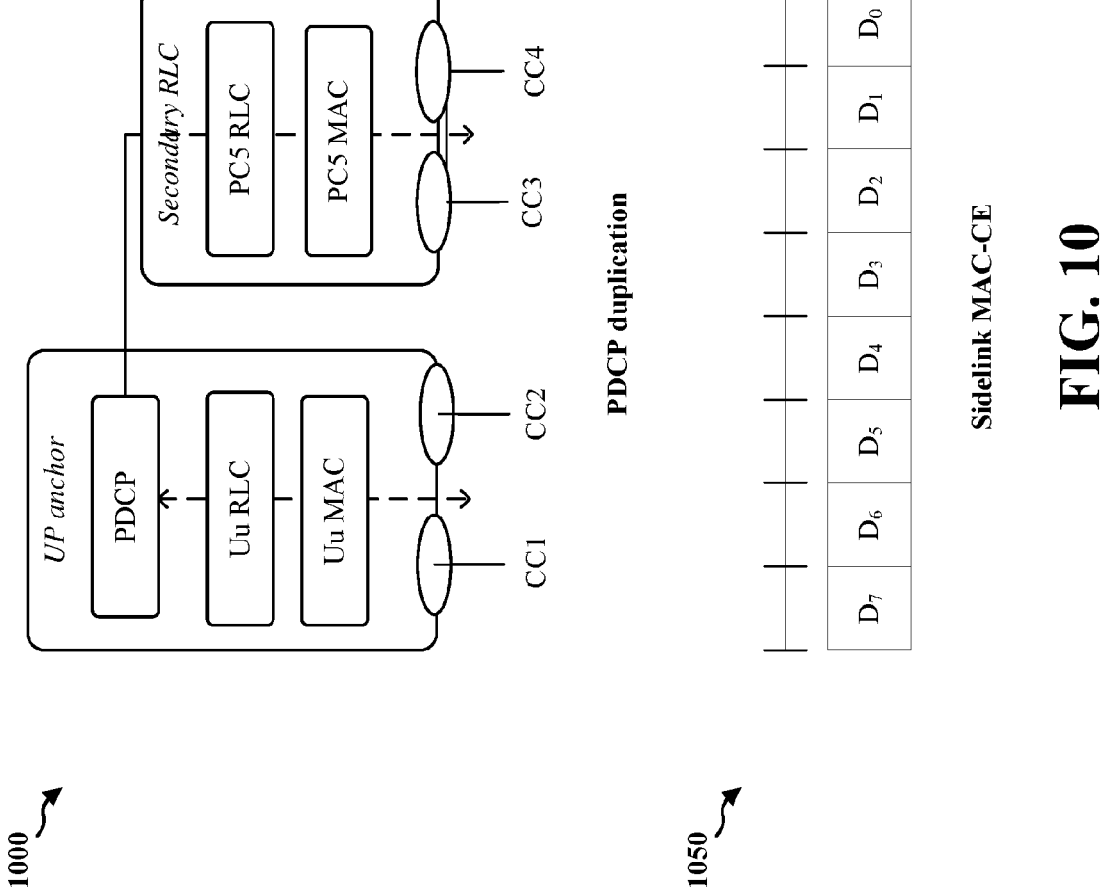
FIG. 10 illustrates a diagram for PDCP duplication and a diagram for a corresponding sidelink medium access control-control element (MAC-CE).

FIG. 10 illustrates a diagram 1000 for PDCP duplication and a diagram 1050 for a corresponding sidelink MAC-control element (MAC-CE). For Uu PDCP duplication, a same packet may be transmitted through two different RLC bearers. For example, the packet may be transmitted through the RLC bearer of the master cell group (MCG) and the RLC bearer of the secondary cell group (SCG). The duplication may be performed in the PDCP layer. For each bearer (e.g., SRB/DRB), PDCP duplication may include providing the same PDCP PDU over each of the two different RLC bearers (e.g., the PC5 RLC bearer and the Uu RLC bearer). SRB may be configured by RRC, while DRB may be configured by RRC and activated by MAC-CE.

PC5 duplication may be activated via the MAC-CE for a DRB, e.g., to provide a sidelink MAC-CE structure, such as the diagram 1000. The sidelink MAC-CE structure may include 8-bits (e.g., D7 to D0). Each field $(D_i)$ may indicate an activated/deactivated status of the PDCP duplication of the corresponding DRB (e.g., $DRB_i$, where i corresponds to an ascending order of a DRB identifier (ID) included in the DRBs configured for the PDCP duplication and the one or more RLC bearers associated with the MAC-CE).

FIG. 11 is a flowchart 1100 of a method of wireless communication. The method may be performed by a UE (e.g., the UE 104, 402, 502, 602, 902; the apparatus 1302; etc.), which may include the memory 360 and which may be the entire UE 104, 402, 502, 602, 902 or a component of the UE 104, 402, 502, 602, 902, such as the TX processor 368, the RX processor 356, and/or the controller/processor 359.

At 1102, the UE may establish a first connection with an AN. For example, referring to FIG. 4, the UE 402 may establish, at 408a, a unicast link with the AN 404. In examples, the first connection (e.g., established at 408a) may be established based on a PC5 interface.

At 1104, the UE may receive at least one of a RRC setup message based on a Uu SRB1 configuration for a split bearer, the split bearer being terminated at the PN, or a RRC resume message over a PC5 interface based on a Uu SRB or a DRB configuration for a PN-terminated bearer. For example, referring to FIG. 9, the UE 902 may receive, at 912, at least one of a RRCsetup message associated with a Uu SRB1 configuration for a PN-terminated split bearer over a PC5 interface or a RRCResume message associated with a Uu SRB/DRB configuration for PN-terminated bearers over the PC5 interface.

At 1106, the UE may receive a RRC reconfiguration message over the PC5 interface including at least one of a mmW cell configuration, or a Uu SRB configuration or a DRB configuration for a bearer terminated at the PN. For example, referring to FIG. 9, the UE 902 may receive, at 914, over the PC5 interface, a RRCReconfiguration message that includes a Uu SRB/DRB configuration for PN-terminated bearers and a mmW cell configuration.

At 1108, the UE may establish, based on the first connection, a second connection with a PN. For example, referring to FIGS. 4 and 9, the UE 402 may establish, at 410, a RRC connection with the PN 406 based on the unicast link established, at 408a, with the AN 404. For example, the UE 902 may perform, at 918, a RACH procedure with the PN 906 based on the RRCSetup message or the RRCResume message received, at 912, from the PN 906 and/or the RRCReconfiguration message received, at 914, from the PN 906.

At 1110, the UE may determine, based on a bearer configuration, whether to route data for the PN via the first connection with the AN or the second connection with the PN. For example, referring to FIG. 4, the UE 402 may determine, at 412a, based on a bearer configuration, whether to route data to the PN 406 via the AN 404 based on a first data path (e.g., data path 1 at 414a and 414b) or whether to route the data directly to the PN 406 based on a second data path (e.g., data path 2 at 416a). In examples, the bearer configuration may be at least one of a SRB or a DRB and a type of the bearer configuration may be at least one of a split bearer, a PCG bearer, or an ACG bearer. At least one of the split bearer, the PCG bearer, or the ACG bearer may be associated with a PDCP.

At 1112, the UE may transmit the data to at least one of the AN or the PN based on the determination of whether to route the data for the PN via the first connection with the AN or the second connection with the PN. For example, referring to FIG. 4, the UE 402 may transmit the data, at 414a, via the data path 1 or the UE 402 may transmit the data, at 416a, via the data path 2 based on the determination, at 412a. The data may be transmitted, at 414a, to the AN 404 based on the type of the bearer configuration being at last one of the split bearer or the ACG bearer, the bearer configuration terminating at the PN 406. In further configurations, the data may be transmitted, at 416a, to the PN 406 based on the type of the bearer configuration being at last one of the split bearer or the PCG bearer, the bearer configuration terminating at the PN 406.

At 1114, the UE may transmit duplicate packets to a PDCP, a first packet of the duplicate packets corresponding to a PC5 RLC bearer, a second packet of the duplicate packets corresponding to a Uu RLC bearer. For example, referring to FIG. 4, the UE 402 may transmit a duplicate data packet, at 414c, to the PN 406 via a duplicate data path when an initial data packet is transmitted, at 414a, to the AN 404 via the data path 1. In further configurations, the UE 402 may transmit, at 416b, the duplicate data packet to the PN 406 via the AN 404 when the initial data packet is transmitted, at 416a, to the PN 406.

FIG. 12 is a flowchart 1200 of a method of wireless communication. The method may be performed by a PN (e.g., the PN 102, 406, 604, 906; the apparatus 1402; etc.), which may include the memory 376 and which may be the entire PN 102, 406, 604, 906 or a component of the PN 102, 406, 604, 906, such as the TX processor 316, the RX processor 370, and/or the controller/processor 375.

At 1202, the PN may establish a first connection with an AN. For example, referring to FIG. 4, the PN 406 may establish, at 408b, a first PN connection with the AN 404.

At 1204, the PN may transmit at least one of a RRC setup message based on a Uu SRB1 configuration for a split bearer, or a RRC resume message over a PC5 interface based on a Uu SRB configuration or a DRB configuration. For example, referring to FIG. 9, the PN 906 may transmit, at 912, at least one of a RRCsetup message associated with a Uu SRB1 configuration for a PN-terminated split bearer over a PC5 interface or a RRCResume message associated with a Uu SRB/DRB configuration for PN-terminated bearers over the PC5 interface.

At 1206, the PN may transmit a RRC reconfiguration message over a PC5 interface including at least one of a mmW cell configuration, or a Uu SRB configuration or a DRB configuration. For example, referring to FIG. 9, the PN 906 may transmit, at 914, via the PC5 interface, a RRCReconfiguration message that includes a Uu SRB/DRB configuration for PN-terminated bearers and a mmW cell configuration.

At 1208, the PN may establish, based on the first connection, a second connection with a UE. For example, referring to FIGS. 4 and 9, the PN 406 may establish, at 410, a RRC connection with the UE 402 based on the first PN connection established, at 408b, with the AN 404. For example, the PN 906 may perform, at 918, a RACH procedure with the UE 902 based on the RRCSetup message or the RRCResume message transmitted, at 912, to the UE 902 and/or the RRCReconfiguration message transmitted, at 914, to the UE 902.

At 1210, the PN may determine, based on a bearer configuration, whether data is to be routed from the UE via the first connection with the AN or the second connection with the UE. For example, referring to FIG. 4, the PN 406 may determine, at 412b, based on a bearer configuration, whether data is to be routed from the UE 402 via the AN 404 based on a first data path (e.g., data path 1 at 414a and 414b) or whether the data is to be routed directly from the UE 402 based on a second data path (e.g., data path 2 at 416a). In examples, the bearer configuration may be at least one of a SRB or a DRB and a type of the bearer configuration may be at least one of a split bearer, a PCG bearer, or an ACG bearer. At least one of the split bearer, the PCG bearer, or the ACG bearer may be associated with a PDCP.

At 1212, the PN may receive the data from at least one of the AN or the UE based on the determination of whether the data is to be routed from the UE via the first connection with the AN or the second connection with the UE. For example, referring to FIG. 4, the PN 406 may receive the data, at 414*b*, via the data path 1 or the PN 406 may receive the data, at 416*a*, via the data path 2 based on the determination, at 412*b*. The data may be received, at 414*b*, from the AN 404 based on the type of the bearer configuration being at last one of the split bearer or the ACG bearer, the bearer configuration terminating at the PN 406. In further configurations, the data may be received, at 416*a*, from the UE 402 based on the type of the bearer configuration being at last one of the split bearer or the PCG bearer, the bearer configuration terminating at the PN 406.

At 1214, the PN may receive duplicate packets from the PDCP, a first packet of the duplicate packets corresponding to a PC5 RLC bearer, a second packet of the duplicate packets corresponding to a Uu RLC bearer. For example, referring to FIG. 4, the PN 406 may receive a duplicate data packet, at 414*c*, from the UE 402 via a duplicate data path when an initial data packet is received, at 414*b*, from the AN 404 via the data path 1. In further configurations, the PN 406 may receive, at 416*c*, the duplicate data packet from the UE 402 via the AN 404 when the initial data packet is received, at 416*a*, from the UE 402.

Figure 13:
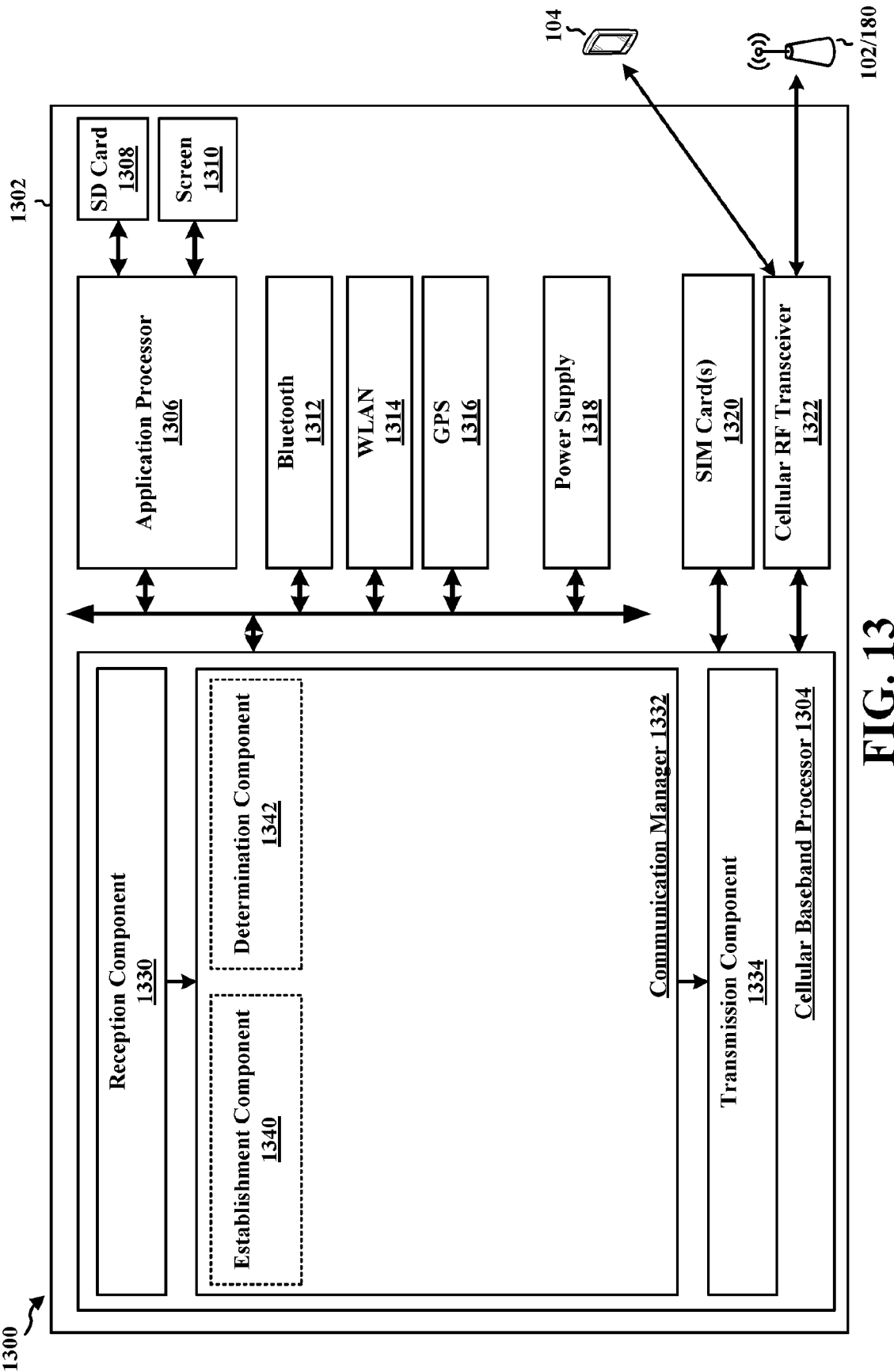
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The reception component 1330 is configured, e.g., as described in connection with 1104 and 1106, to receive at least one of a RRC setup message based on a Uu SRB1 configuration for a split bearer, the split bearer being terminated at the PN, or a RRC resume message over a PC5 interface based on a Uu SRB or a DRB configuration for a PN-terminated bearer; and to receive a RRC reconfiguration message over the PC5 interface including at least one of a mmW cell configuration, or a Uu SRB configuration or a DRB configuration for a bearer terminated at the PN. The communication manager 1332 includes an establishment component 1340 that is configured, e.g., as described in connection with 1102 and 1108, to establish a first connection with an AN; and to establish, based on the first connection, a second connection with a PN. The communication manager 1332 further includes a determination component 1342 that is configured, e.g., as described in connection with 1110, to determine, based on a bearer configuration, whether to route data for the PN via the first connection with the AN or the second connection with the PN. The transmission component 1334 is configured, e.g., as described in connection with 1112 and 1114, to transmit the data to at least one of the AN or the PN based on the determination of whether to route the data for the PN via the first connection with the AN or the second connection with the PN; and to transmit duplicate packets to a PDCP, a first packet of the duplicate packets corresponding to a PC5 RLC bearer, a second packet of the duplicate packets corresponding to a Uu RLC bearer.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for establishing a first connection with an AN; means for establishing, based on the first connection, a second connection with a PN; means for determining, based on a bearer configuration, whether to route data for the PN via the first connection with the AN or the second connection with the PN; and means for transmitting the data to at least one of the AN or the PN based on the determination of whether to route the data for the PN via the first connection with the AN or the second connection with the PN. The apparatus 1302 further includes means for transmitting duplicate packets to the PDCP, a first packet of the duplicate packets corresponding to a PC5 RLC bearer, a second packet of the duplicate packets corresponding to a Uu RLC bearer. The apparatus 1302 further includes means for receiving at least one of a RRC setup message based on a Uu SRB1 configuration for a split bearer, the split bearer being terminated at the PN, or a RRC resume message over a PC5 interface based on a Uu SRB configuration or a DRB configuration for a bearer terminated at the PN. The apparatus 1302 further includes means for receiving a RRC reconfiguration message over a PC5 interface including at least one of a mmW cell configuration, or a Uu SRB configuration or a DRB configuration for a bearer terminated at the PN. The aforementioned means may be one or more of the aforementioned components of the apparatus 1302 configured to perform the functions recited by the aforementioned means. As described supra, the apparatus 1302 may include the TX Processor 368, the RX Processor 356, and the controller/ processor 359. As such, in one configuration, the aforementioned means may be the TX Processor 368, the RX Processor 356, and the controller/processor 359 configured to perform the functions recited by the aforementioned means.

Figure 14:
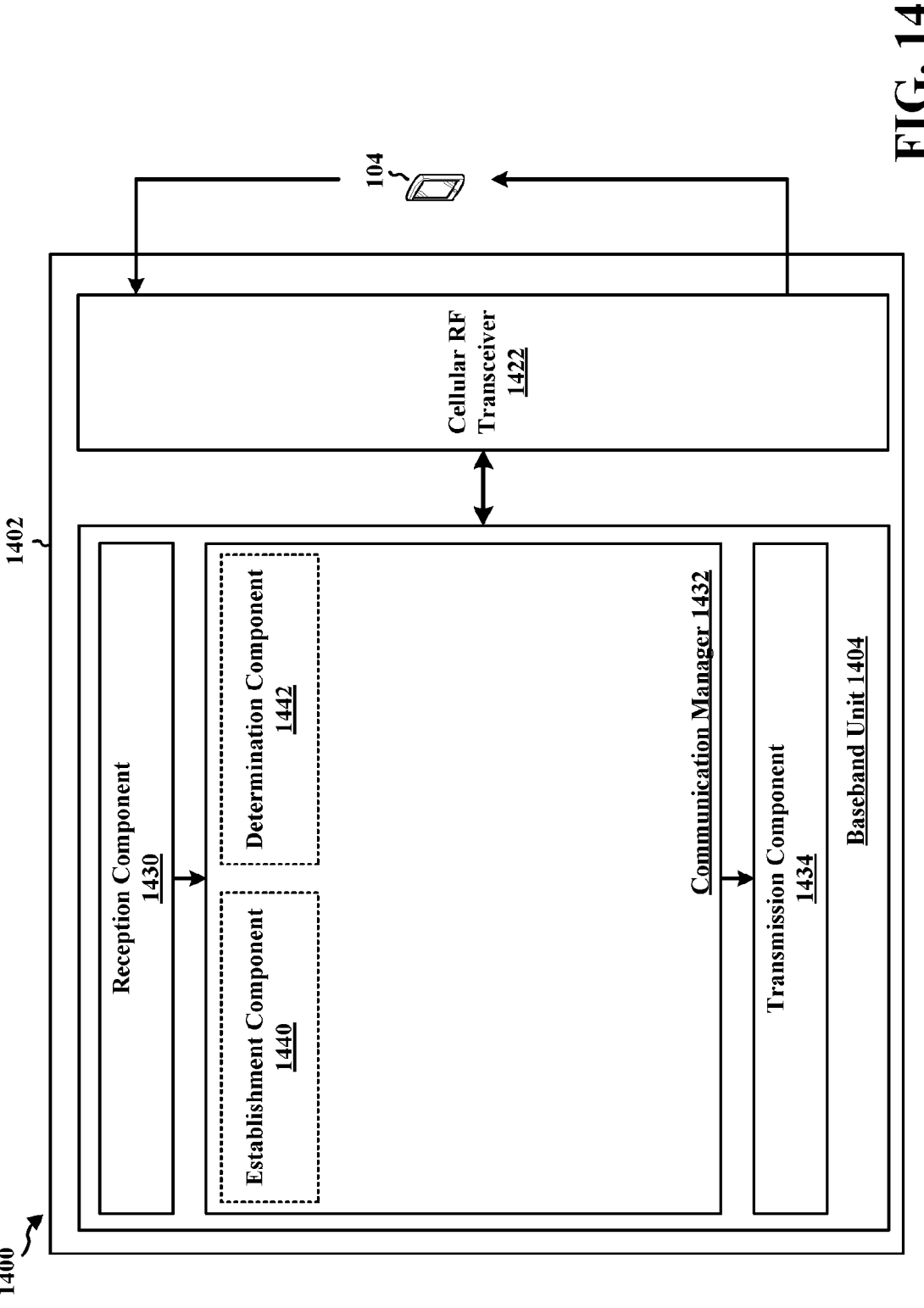
FIG. 14 is a diagram illustrating an example of a hardware implementation for an example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The reception component 1430 is configured, e.g., as described in connection with 1212 and 1214, to receive the data from at least one of the AN or the UE based on the determination of whether the data is to be routed from the UE via the first connection with the AN or the second connection with the UE; and to receive duplicate packets from the PDCP, a first packet of the duplicate packets corresponding to a PC5 RLC bearer, a second packet of the duplicate packets corresponding to a Uu RLC bearer. The communication manager 1432 includes an establishment component 1440 that is configured, e.g., as described in connection with 1202 and 1208, to establish a first connection with an AN; and to establish, based on the first connection, a second connection with a UE. The communication manager 1432 further includes a determination component 1442 that is configured, e.g., as described in connection with 1210, to determine, based on a bearer configuration, whether data is to be routed from the UE via the first connection with the AN or the second connection with the UE. The transmission component 1434 is configured, e.g., as described in connection with 1204 and 1206, to transmit at least one of a RRC setup message based on a Uu SRB1 configuration for a split bearer, or a RRC resume message over a PC5 interface based on a Uu SRB configuration or a DRB configuration; and to transmit a RRC reconfiguration message over a PC5 interface including at least one of a mmW cell configuration, or a Uu SRB configuration or a DRB configuration.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for establishing a first connection with an AN; means for establishing, based on the first connection, a second connection with a UE; means for determining, based on a bearer configuration, whether data is to be routed from the UE via the first connection with the AN or the second connection with the UE; and means for receiving the data from at least one of the AN or the UE based on the determination of whether the data is to be routed from the UE via the first connection with the AN or the second connection with the UE. The apparatus 1402 further includes means for receiving duplicate packets from the PDCP, a first packet of the duplicate packets corresponding to a PC5 RLC bearer, a second packet of the duplicate packets corresponding to a Uu RLC bearer. The apparatus 1402 further includes means for transmitting at least one of a RRC setup message based on a Uu SRB1 configuration for a split bearer, or a RRC resume message over a PC5 interface based on a Uu SRB configuration or a DRB configuration. The apparatus 1402 further includes means for transmitting a RRC reconfiguration message over a PC5 interface including at least one of a mmW cell configuration, or a Uu SRB configuration or a DRB configuration. The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A user equipment (UE), comprising:
at least one memory comprising instructions;
at least one transceiver; and
at least one processor configured to execute the instructions to cause the UE to:
    establish, via the at least one transceiver, a first connection with an assistant node (AN);
    establish, via the at least one transceiver and based on the first connection, a second connection with a primary node (PN);
    determine, based on a bearer configuration, whether to route data for the PN via the first connection with the AN or the second connection with the PN;
    communicate, via the at least one transceiver and with the AN, a medium access control (MAC) control element (MAC-CE) that indicates whether duplication of the data is activated or deactivated; and
    transmit, via the at least one transceiver, the data to at least one of the AN or the PN, the transmission being based on whether the duplication of the data is activated or deactivated and based on the determination of whether to route the data for the PN via the first connection with the AN or the second connection with the PN.

2. The UE of claim 1, wherein the bearer configuration is at least one of a signaling radio bearer (SRB) or a dedicated radio bearer (DRB).

3. The UE of claim 2, wherein a type of the bearer configuration is one of a split bearer, a primary cell group (PCG) bearer, or an assistant cell group (ACG) bearer.

4. The UE of claim 3, wherein the at least one processor is configured to cause the UE to transmit the data via the at least one transceiver and to the AN based on the type of the bearer configuration being at least one of the split bearer or the ACG bearer, the bearer configuration terminating at the PN.

5. The UE of claim 3, wherein the at least one processor is configured to cause the UE to transmit the data via the at least one transceiver and to the PN based on the type of the bearer configuration being at least one of the split bearer or the PCG bearer, the bearer configuration terminating at the PN.

6. The UE of claim 3, wherein at least one of the split bearer, the PCG bearer, or the ACG bearer is associated with a packet data convergence protocol (PDCP).

7. The UE of claim 6, wherein the at least one processor is further configured to cause the UE to transmit, via the at least one transceiver and based on the MAC-CE indicating that the duplication is activated, a first packet corresponding to a PC5 radio link control (RLC) bearer, and a second packet that is a duplicate of the first packet corresponding to a Uu RLC bearer.

8. The UE of claim 1, wherein the first connection is based on a PC5 interface.

9. The UE of claim 1, wherein the at least one processor is further configured to cause the UE to receive, via the at least one transceiver, at least one of:
    a radio resource control (RRC) setup message based on a Uu signaling radio bearer-1 (SRB1) configuration associated with a split bearer, the split bearer being terminated at the PN, or
    a RRC resume message over a PC5 interface based on a Uu signaling radio bearer (SRB) configuration associated with a bearer terminated at the PN or a dedicated radio bearer (DRB) configuration associated with the bearer terminated at the PN.

10. The UE of claim 1, wherein the at least one processor is further configured to cause the UE to receive a radio resource control (RRC) reconfiguration message over a PC5 interface, the RRC reconfiguration message including at least one of a millimeter wave (mmW) cell configuration associated with a bearer terminated at the PN, a Uu signaling radio bearer (SRB) configuration associated with the bearer terminated at the PN, or a dedicated radio bearer (DRB) configuration associated with the bearer terminated at the PN.

11. A primary node (PN), comprising:
at least one memory comprising instructions;
at least one transceiver; and
at least one processor configured to execute the instructions to cause the PN to:
    establish, via the at least one transceiver, a first connection with an assistant node (AN);
    establish, via the at least one transceiver and based on the first connection, a second connection with a user equipment (UE);
    determine, based on a bearer configuration, whether data is to be routed from the UE via the first connection with the AN or the second connection with the UE;
    communicate, via the at least one transceiver and with the UE, a medium access control (MAC) control element (MAC-CE) that indicates whether duplication of the data is activated or deactivated; and
    receive, via the at least one transceiver, the data from at least one of the AN or the UE, the reception being based on whether the duplication of the data is activated or deactivated and based on the determination of whether the data is to be routed from the UE via the first connection with the AN or the second connection with the UE.

12. The PN of claim 11, wherein the bearer configuration is at least one of a signaling radio bearer (SRB) or a dedicated radio bearer (DRB).

13. The PN of claim 12, wherein a type of the bearer configuration is one of a split bearer, a primary cell group (PCG) bearer, or an assistant cell group (ACG) bearer.

14. The PN of claim 13, wherein the at least one processor is configured to cause the PN to receive the data via the at least one transceiver from the AN based on the type of the bearer configuration being at least one of the split bearer or the ACG bearer.

15. The PN of claim 13, wherein the at least one processor is configured to cause the PN to receive the data via the at least one transceiver from the UE based on the type of the bearer configuration being at least one of the split bearer or the PCG bearer.

16. The PN of claim 13, wherein at least one of the split bearer, the PCG bearer, or the ACG bearer is associated with a packet data convergence protocol (PDCP).

17. The PN of claim 16, wherein the at least one processor is further configured to cause the PN to receive, via the at least one transceiver and based on the MAC-CE indicating that the duplication is activated, a first packet corresponding to a PC5 radio link control (RLC) bearer, and a second packet that is a duplicate of the first packet corresponding to a Uu RLC bearer.

18. The PN of claim 11, wherein the at least one processor is further configured to cause the PN to transmit, via the at least one transceiver, at least one of:

a radio resource control (RRC) setup message based on a Uu signaling radio bearer-1 (SRB1) configuration associated with a split bearer, or a RRC resume message over a PC5 interface based on a Uu signaling radio bearer (SRB) configuration or a dedicated radio bearer (DRB) configuration.

19. The PN of claim 11, wherein the at least one processor is further configured to cause the PN to transmit, via the at least one transceiver, a radio resource control (RRC) reconfiguration message over a PC5 interface including at least one of a millimeter wave (mmW) cell configuration, or a Uu signaling radio bearer (SRB) configuration or a dedicated radio bearer (DRB) configuration.

* * * * *